US006355989B1

(12) United States Patent
Westcott

(10) Patent No.: US 6,355,989 B1
(45) Date of Patent: Mar. 12, 2002

(54) PUBLIC TRANSPORTATION SIGNALLING DEVICE

(75) Inventor: Sean G. Westcott, Eugene, OR (US)

(73) Assignee: Stellar Technologies, LLC, Boise, ID (US)

( * ) Notice: Subject to any disclaimer, the term of this patent is extended or adjusted under 35 U.S.C. 154(b) by 0 days.

(21) Appl. No.: 09/510,461

(22) Filed: Feb. 22, 2000

Related U.S. Application Data

(60) Provisional application No. 60/121,613, filed on Feb. 25, 1999.

(51) Int. Cl.[7] ............................... B60L 1/00; B60L 3/00

(52) U.S. Cl. ....................................................... 307/10.1

(58) Field of Search ................................ 323/318, 349; 307/101, 9.1, 10.1; 340/992, 993, 994

(56) References Cited

U.S. PATENT DOCUMENTS 4,350,969 A * 9/1982 Greer
5,021,780 A * 6/1991 Fabiano et al.
5,774,072 A 6/1998 Wu

* cited by examiner

*Primary Examiner*—Edward H. Tso
(74) *Attorney, Agent, or Firm*—Frank J. Dykas; Robert L. Shaver; Stephen M. Nipper

(57) ABSTRACT

A public transportation driver signalling device. The device is comprised of a tubular post member having a removable end cap. A signal light is located within the tubular post member adjacent the end cap. The signal light is preferably a light emitting diode. The light communicates with the exterior of the post through an opening in the post wall. A switch is located within the tubular post member in the lower half thereof. The switch is preferably an intermittent on/off type push button type switch with the push button extending through an opening in the wall of the tubular post member for access by a transportation patron.

6 Claims, 1 Drawing Sheet

PUBLIC TRANSPORTATION SIGNALLING DEVICE

CROSS REFERENCE TO RELATED APPLICATIONS

This application claims the benefit of U.S. Provisional Application Ser. No. 60/121,613 filed Feb. 25, 1999.

BACKGROUND OF THE INVENTION

This invention relates to a device used for signalling the drivers of public transportation vehicles that a passenger wishes to be picked up.

For example, the device can be used for signalling bus drivers at a bus stop that a passenger desires the driver to stop and allow the passenger to board the bus for transportation. The invention can also be used for signalling other public transportation vehicles. such as taxis.

Such a signalling device is particularly useful during inclement weather when passengers huddle in out-of-sight doorways, or where a passenger is standing in a position that wrongly indicates to the driver that they are not a passenger.

Transit districts increasingly receive complaints that buses have passed by a person standing at or near a marked bus stop and have been searching for simple, inexpensive solutions to solve this problem.

SUMMARY OF THE INVENTION

It is an object of this invention to provide a simple and inexpensive signalling device for use in public transportation.

It is a further object of this invention to provide a simple and inexpensive bus signalling device for use at bus stops.

These and other objects are achieved by providing a signalling device comprised of a tubular post member, a signal light subassembly located within the post adjacent its upper end with the signal light communicating with the exterior of the post, a power source, a switch subassembly, and wiring to electrically connect the signal light, power source, and switch.

Figure 1:
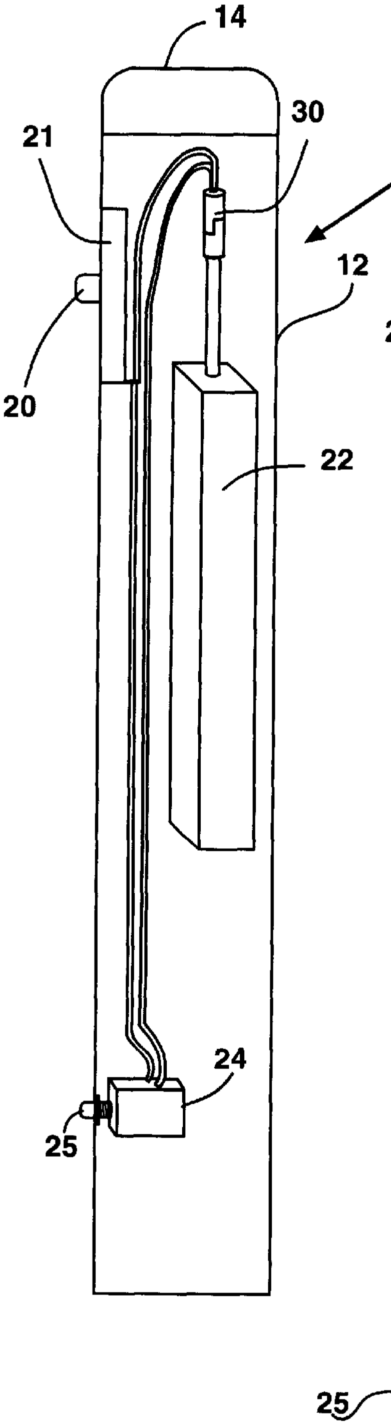
FIG. 1 is a side view of the signalling device of the invention.

Reference numerals used in the drawings are:

| | |
|---|---|
| 10 | Signalling device |
| 12 | Post |
| 14 | Post cap |
| 20 | Signal light |
| 21 | Signal light case |
| 22 | Battery pack |
| 24 | Electric switch |
| 25 | Electric switch button |
| 26 | Electric wire |
| 27 | Electric wire |
| 28 | Eiectric wire |
| 30 | Electrical connector |
| 32 | Electric jack |
| 34 | Electric jack |
| 126 | Electric wire |
| 127 | Electric wire |

DESCRIPTION OF PREFERRED EMBODIMENTS

The signalling device 10 is illustrated in FIG. 1 which is a side view of signaling device 10 with the interior exposed in order to illustrate the location of the signal light 20 and its associated electrical circuitry, discussed in more detail below.

Signal 10 is comprised of a tubular (hollow) post member 12 having a removable cap member 14. Post 12 can have any suitable shape in cross section, such as circular, square, or rectangular. A suitable post is 2 inch by 2 inch tubular steel.

It has been found that a desirable height for the top of post 12 above ground level is about nine feet.

Cap member 14 can be press fit over the upper end of post 12 for easy removal. If post 12 has a circular cross-section, cap 14 and the upper end of post 12 can be threaded to allow cap 14 to be screwed on and off the upper end of post 12.

Post 12 can be installed at a public transportation stop by any suitable means, such as by burying the lower portion in the ground, or by attaching the base to a concrete footing by means of nuts and bolts.

Signal light 20 is located on the side of post 12 facing oncoming traffic so as to be visible to the driver of a bus or other public transportation vehicle approaching the stop where the signalling device is located. Signal light 20 is located near the top of post 12, just below cap 14.

Signal light 20 is preferably a light emitting diode type flashing light of the type used by bicyclists and joggers, and is contained in a suitable case, such as circular case 22. A suitable such light emitting diode type flashing light is manufactured by Selecta Switch as part number SL-A05015C1.

Case 22 is attached to the inside of post 12 by suitable attachment means.

Signal light 20 communicates with the exterior of post 12 through a suitable opening in tubular post member 12. Light 20 can extend through such an opening as long as it is adapted to do so in a watertight manner, such as by placing the light inside a rubber grommet. Alternatively, light 20 can be located behind the opening in post 12 with the opening being covered by a transparent piece of glass or plastic.

Figure 2:
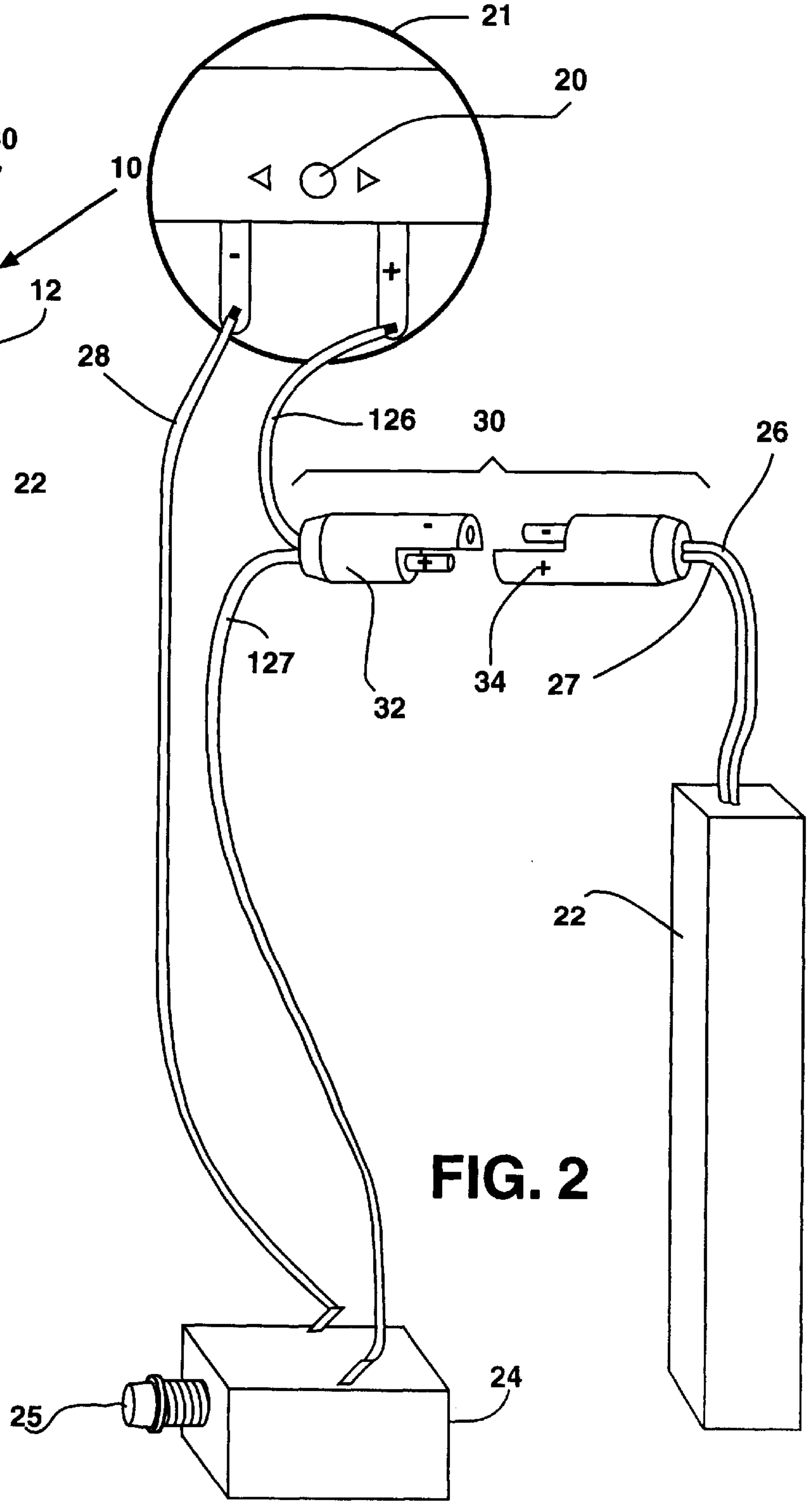
FIG. 2 is a view of the signal light and its associated electrical circuit.

Signal light 20 is connected to a battery pack 22 and an electrical switch 24 by suitable (e,.g., 16 gage copper) wiring 26, 126, 27, 127, and 28, electrically connected as illustrated in FIG. 2.

A two pole polarized electrical connector member 30 having two mating jacks or plugs 32 and 34 connects battery pack 22 to signal light 20 and switch 24 as shown in FIG. 2. Jacks 32 and 34 may be pulled apart for easy replacement of battery pack 24.

Battery pack 22 is preferably of the type that contains two "C" cell batteries.

Although the signal light 10 of the invention is described as using a battery pack 22 for its power source, if electric power is available to the location of post 12 a transformer could be used to step down the voltage of the available power to a suitable level.

Switch 24 has a button 25 which extends through an opening in the wall of post 12, as shown in FIG. 1, for easy access by a bus patron. Button 25 is located at an appropriate height for easy handicap access, e.g., about four feet from ground level after post 12 is installed. A suitable push button switch is manufactured by Selecta Switch as part number AV191003C940N.

Switch 24 is an intermittent on/off type switch which is normally in the off position, and remains in the on position after button 25 is depressed for only a limited period of time. Alternatively, switch 24 can be designed to activate the signal light 20 only for so long as the button 25 is depressed. The latter alternative prevents false signalling.

In operation, post 12 is located, for example, at a bus stop and secured to the ground by any suitable means, as discussed above.

A bus patron desiring to signal a bus scheduled to arrive in the near future merely depresses button 25. When button 25 is depressed to the on position, the circuit between battery pack 24 and signal light 20 is closed, and signal light 20 begins to flash. The driver of a bus approaching the bus stop can see signal light 20 flashing, and knows that a passenger is waiting to be picked up.

In the event the battery pack 24 becomes exhausted, a maintenance worker merely removes cap 14 from post 12, pulls wires 126, 127, and 28 toward the top, unplugs jacks 32 and 34 of connector 30, removes exhausted battery pack 24, and replaces it with a fresh battery pack by reversing the foregoing steps.

The invention claimed is:

1. A public transportation driver signalling device comprising:

a tubular post member;

a signal light subassembly located within said post adjacent its upper end, the signal light of said subassembly communicating with the exterior of said post through an opening therein;

a power source;

a switch subassembly; and wiring electrically connecting said signal light, said power source, and said switch subassembly in a manner adapted to allow said signal light to be turned on upon actuation of said switch.

2. The device of claim 1 wherein said signal light flashes when said signal light is electrically connected to said power source by actuation of said switch.

3. The device of claim 1 wherein said signal light subassembly is a light emitting diode.

4. The device of claim 1 wherein said power source is a battery pack located within said tubular post member.

5. The device of claim 1 wherein said switch subassembly is an intermittent on/off push button switch located within said tubular post member with the push button of said subassembly communicating with the exterior of said tubular post member.

6. The device of claim 1 wherein said tubular post member has a cap removably attached to its upper end.

* * * * *